(12) United States Patent
Chen et al.

(10) Patent No.: US 6,912,343 B1
(45) Date of Patent: Jun. 28, 2005

(54) ADJUSTABLE FIBER OPTICAL FILTERS

(75) Inventors: Zhihao Chen, Carlsbad, CA (US); Zheng Chen, Chengdu (CN); Bo Pi, Carlsbad, CA (US)

(73) Assignee: Oluma, Inc., Carlsbad, CA (US)

( * ) Notice: Subject to any disclaimer, the term of this patent is extended or adjusted under 35 U.S.C. 154(b) by 280 days.

(21) Appl. No.: 10/268,622

(22) Filed: Oct. 9, 2002

Related U.S. Application Data

(60) Provisional application No. 60/328,723, filed on Oct. 11, 2001.

(51) Int. Cl.[7] ................................................ G02B 6/42
(52) U.S. Cl. ....................................................... 385/30
(58) Field of Search .............................. 385/30, 27–29, 385/41–42, 48, 140

(56) References Cited

U.S. PATENT DOCUMENTS

| | | | |
|---|---|---|---|
| 5,479,542 A | * | 12/1995 | Krivoshlykov ............... 385/30 |
| 5,966,493 A | * | 10/1999 | Wagoner et al. ............. 385/140 |
| 6,208,798 B1 | * | 3/2001 | Morozov et al. ............ 385/140 |
| 6,621,952 B1 | * | 9/2003 | Pi et al. ......................... 385/30 |
| 2002/0168170 A1 | * | 11/2002 | Chan ........................... 385/140 |
| 2003/0202548 A1 | * | 10/2003 | Andersen et al. ............. 372/20 |

FOREIGN PATENT DOCUMENTS

EP 178045 A1 * 4/1986 ............. G02F/1/11

* cited by examiner

*Primary Examiner*—Diane I. Lee
(74) *Attorney, Agent, or Firm*—Fish & Richardson P.C.

(57) ABSTRACT

Adjustable filters formed in fibers or waveguides based on evanescent coupling, where a coupling layer is formed between a waveguide overlay and a side-polished coupling port on the fiber or waveguide. A control mechanism may be provided to adjust a property of at least one of the waveguide overlay and the coupling layer to adjust the output of the filter.

18 Claims, 10 Drawing Sheets

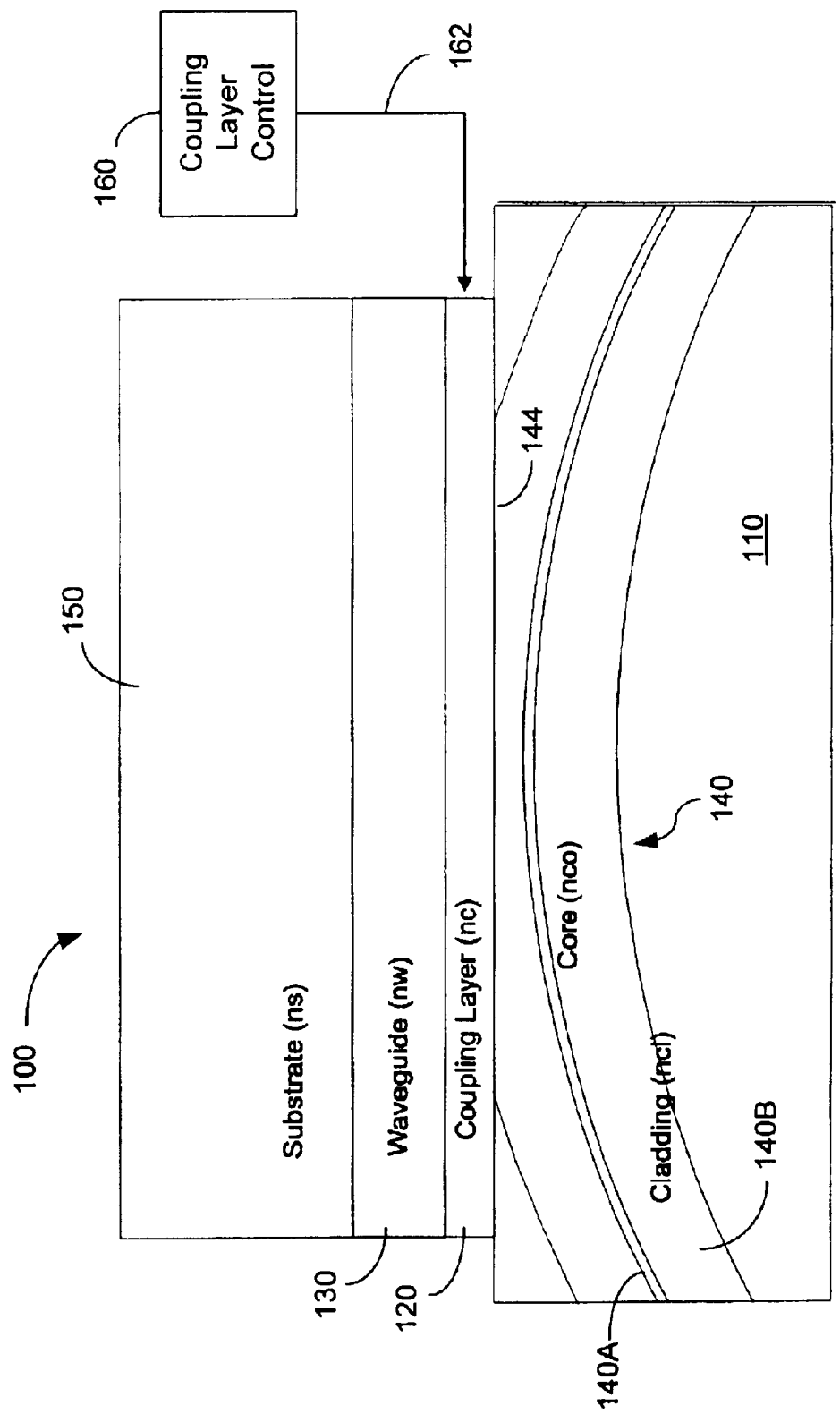

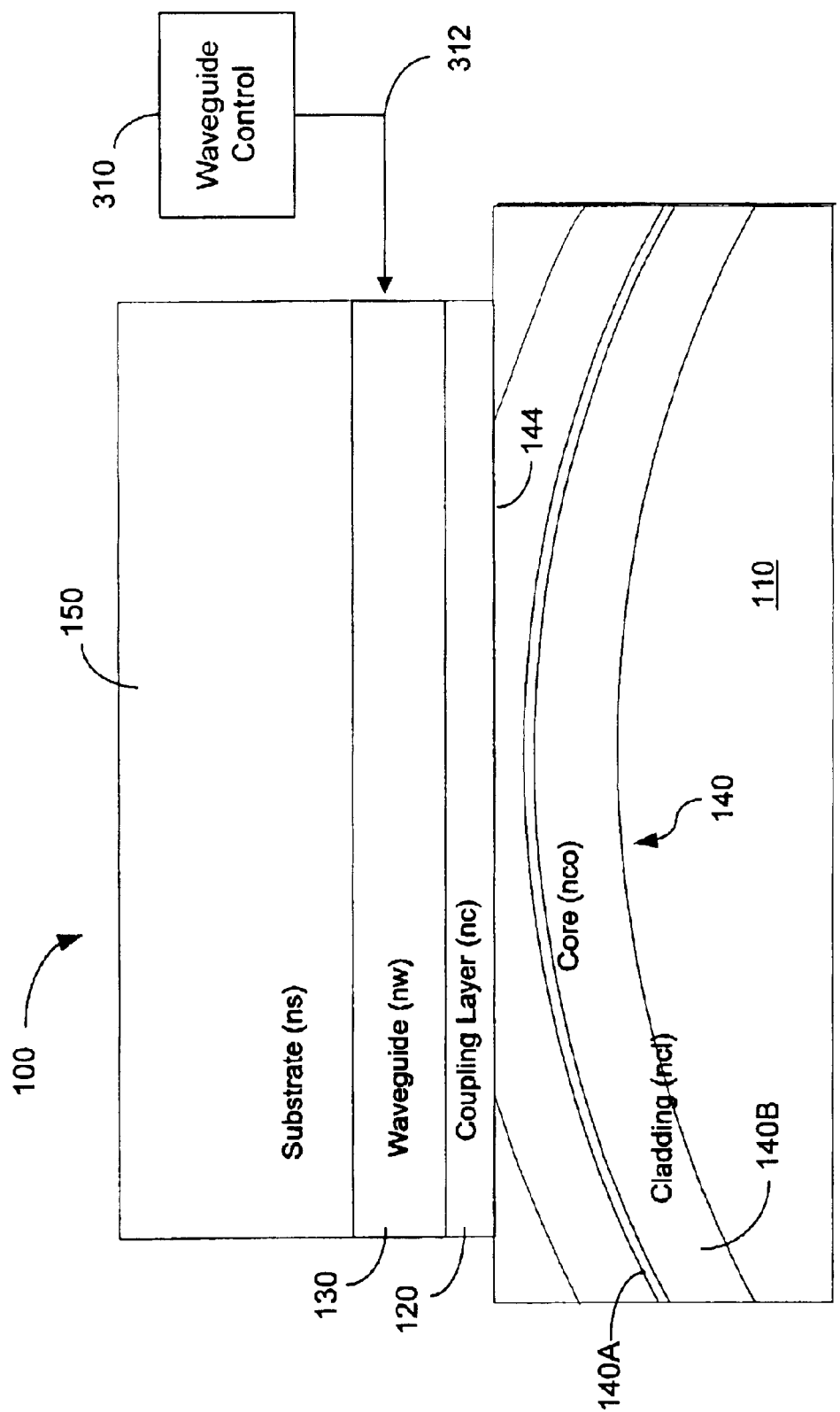

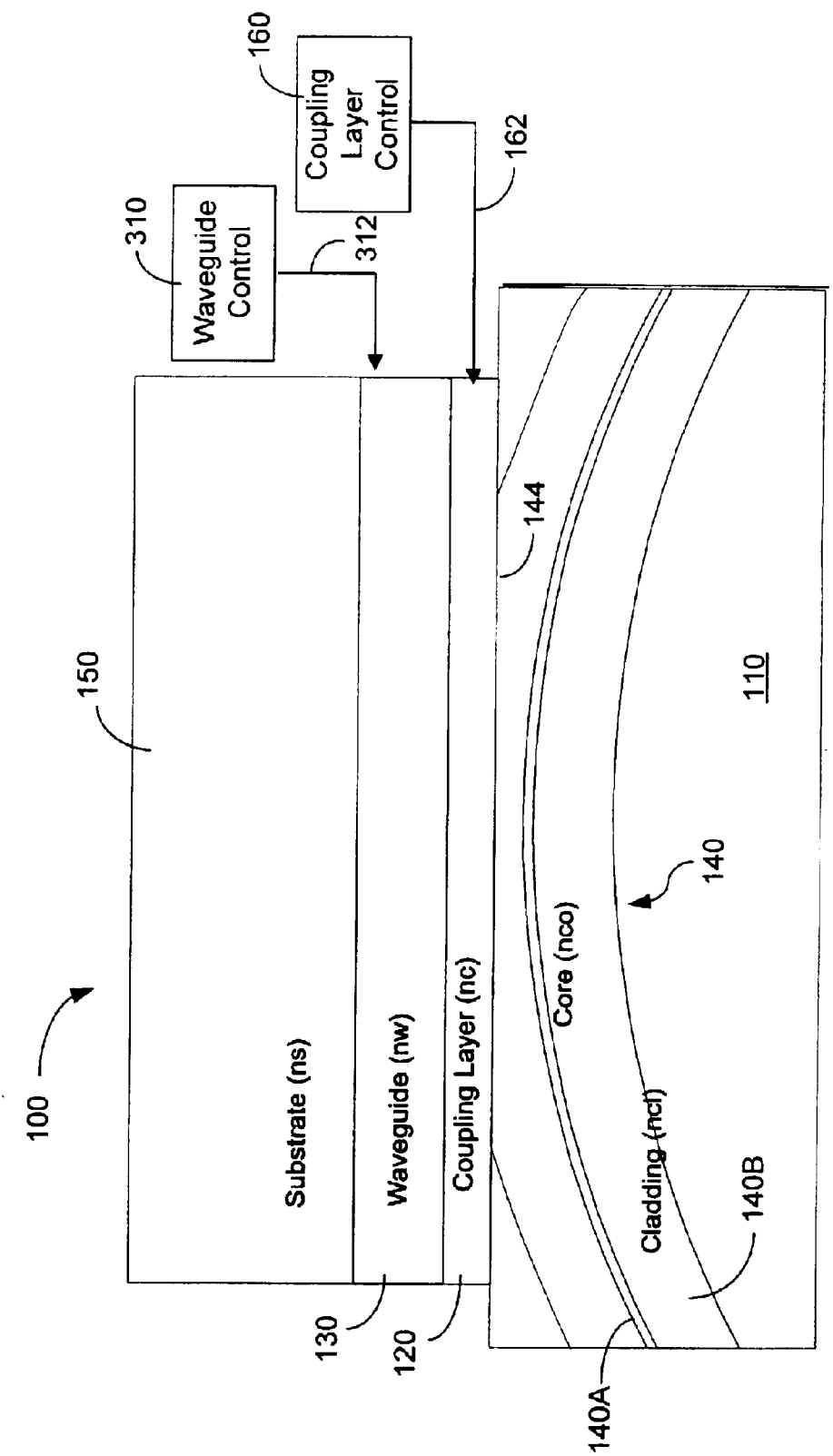

ADJUSTABLE FIBER OPTICAL FILTERS

This application claims the benefit of U.S. Provisional Application No. 60/328,723 entitled "Adjustable Filters and Its Applications" and filed Oct. 11, 2001, the entire disclosure of which is incorporated herein by reference.

BACKGROUND

This application relates to fiber optical filters based on evanescent coupling through a side-polished fiber coupling port and applications of such filters.

Optical waves may be transported through optical waveguiding elements or "light pipes" such as optical fibers, or optical waveguides formed on substrates. A typical fiber may be simplified as a fiber core and a cladding layer surrounding the fiber core. The refractive index of the fiber core is higher than that of the fiber cladding to confine the light. Light rays that are coupled into the fiber core within a maximum angle with respect to the axis of the fiber core are totally reflected at the interface of the fiber core and the cladding. This total internal reflection provides a mechanism for spatially confining the optical energy of the light rays in one or more selected fiber modes to guide the optical energy along the fiber core. Optical waveguides formed on substrates may also be designed to provide spatial optical confinement based on total the internal reflection. Planar waveguides, for example, may be formed by surrounding a slab or strip of a dielectric material with one or more dielectric materials with refractive indices less than that of the dielectric slab or strip.

The guided optical energy in the fiber or waveguide, however, is not completely confined within the core of the fiber or waveguide. In a fiber, for example, a portion of the optical energy can "leak" through the interface between the fiber core and the cladding via an evanescent field that essentially decays exponentially with the distance from the core-cladding interface. This evanescent leakage may be used to couple optical energy into or out of the fiber core, or alternatively, to perturb the guided optical energy in the fiber core.

SUMMARY

This application describes adjustable optical filters formed in waveguiding elements such as fibers and planar waveguides that have at least one adjustable optical element positioned at a side-polished coupling port. The adjustable optical element is controlled in response to a proper control signal to control the evanescent coupling and thus the signal strength at a selected wavelength in one or more guided optical signals. Two or more such adjustable filters may be combined to achieve a signal control at different wavelengths in a wavelength-division multiplexing (WDM) system.

BRIEF DESCRIPTION OF THE DRAWINGS

FIGS. 1A and 1B show one embodiment of an adjustable fiber filter.

FIG. 3A shows another embodiment of an adjustable fiber filter.

FIG. 4 shows yet another embodiment of an adjustable fiber filter where both the waveguide overlay and the coupling layer can be adjusted.

DETAILED DESCRIPTION

Figure 1A:
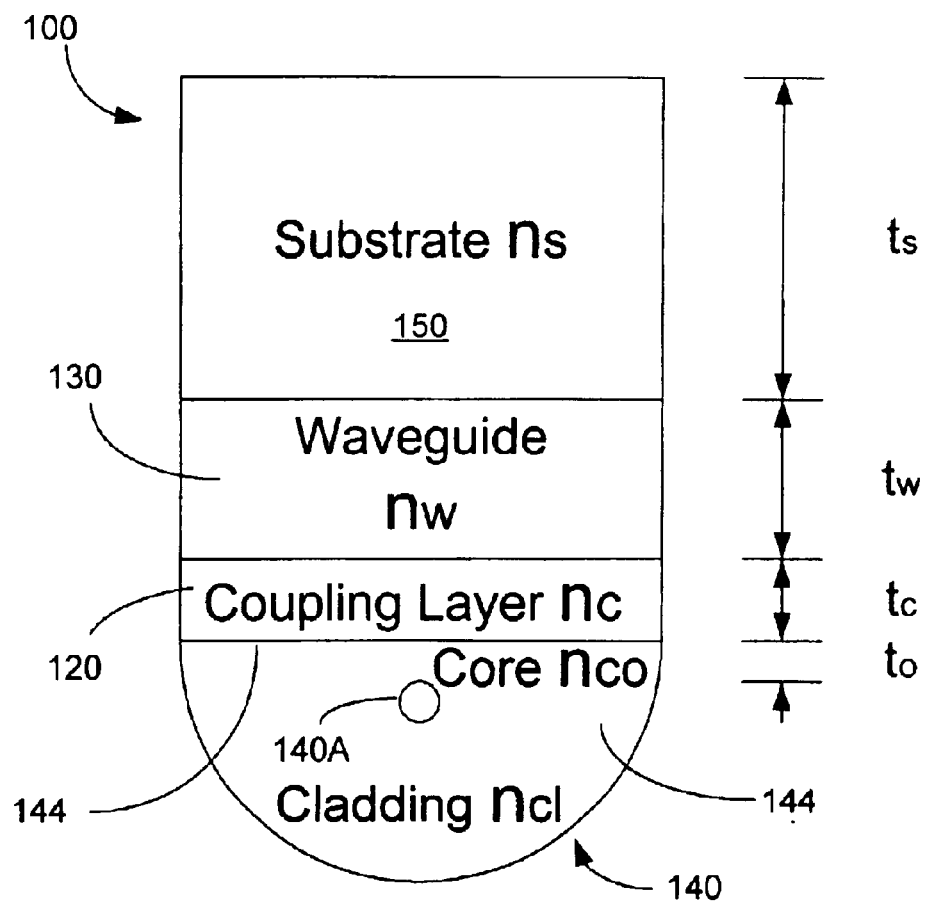

A wavelength-selective fiber optical filter may be made from a side-polished fiber with an overlay waveguide structure and a controllable coupling layer. FIGS. 1A and 1B show one embodiment of such a fiber filter 100 formed in a fiber 140.

FIG. 1A shows a cross sectional view of a portion of the filter 100. The fiber 140 has a core 140A and a cladding 140B. One portion of the fiber 140 has its cladding partially removed to form a surface 144. The surface 144 is within the reach of the evanescent field of the guided light in the fiber core 140A. The surface 144 is polished to operate as a side-polished fiber coupling port through which light traveling inside fiber core 140A may be coupled out. As described below, this coupling mechanism may be used to selectively couple light out of the fiber 140 at a selected wavelength so as to control the amount of the signal at the selected wavelength that remains in the fiber 140.

The fiber filter 100 also includes a coupling layer 120 formed of a transparent dielectric material and a waveguide overlay 130. The coupling layer 120 may be directly in contact with the surface 144 and the waveguide overlay 130 is formed on top of the coupling layer 120. If the optical mode of the evanescently-coupled light matches a mode supported by the waveguide overlay 130, the light can be coupled through the coupling layer 120 into the waveguide overlay 130. Once this coupling happens, the coupled light in waveguide overlay 130 is no longer guided by the fiber 140. As a result, the remaining light in that mode of the fiber 140 is attenuated.

In the above design, the optical configuration of the waveguide overlay 130 generally determines the wavelength at which the guided light in the fiber 140 may be coupled out. On the other hand, the optical property of the coupling layer 120, e.g., its refractive index, may be controlled and adjusted to control the coupling strength. In implementations, the fiber filter 100 may be made tunable to produce a variable coupling strength by adjusting the refractive index of either of the waveguide overlay 130 and the coupling layer 120, or by adjusting the indices of both. To tune the frequency of the fiber filter 100, the index of the waveguide overlay 130 may be adjusted.

In the illustrated embodiment, the waveguide overlay 130 may be supported by a waveguide substrate 150 which may have a refractive index different from that of the waveguide overlay 130. The waveguide overlay 130 may be planar waveguide formed in the substrate 150. In particular, the waveguide overlay 130 may be implemented as a multi-mode slab waveguide. The geometry and the index of the waveguide overlay 130 generally determine the mode or modes supported thereby. The coupling layer 120 may be a controllable coupling layer formed from a material whose index ($n_c$) changes in response to a control signal or stimulus. The thickness $t_c$ of the coupling layer 120 may be set to be small so that the evanescent field of a guided mode in the fiber 140 can extend to the waveguide overlay 150. In some implementations, for example, the thickness of the coupling layer 120 may be on the order of one micron, such as less than a few microns (e.g., 3 microns).

FIG. 1B shows a side view of the fiber filter 100. A fiber support substrate 110 is shown to hold the fiber 140. This may be achieved by having a groove formed in the substrate 110 in which the a portion of the fiber 140 is placed and fixed. A control unit 160 is coupled to apply a control signal or stimulus 162 to change the index of the coupling layer 120. By adjusting $n_c$, the strength of the optical coupling between the fiber 140 and waveguide 130 may be adjusted. The coupling layer 120 may be formed of various materials, examples of which include a thermal-optic material whose index $n_c$ is tunable by changing the temperature, an electro-optic material whose index $n_c$ is tunable by changing an applied electric field, a magnetic-optic material whose index $n_c$ is tunable by an applied magnetic field, and a radiation-sensitive material whose index is tunable by intensity of a radiation beam. These and other adjustable materials have their own individual characteristics and may be selected according to the specific requirements of the applications.

Figure 2:
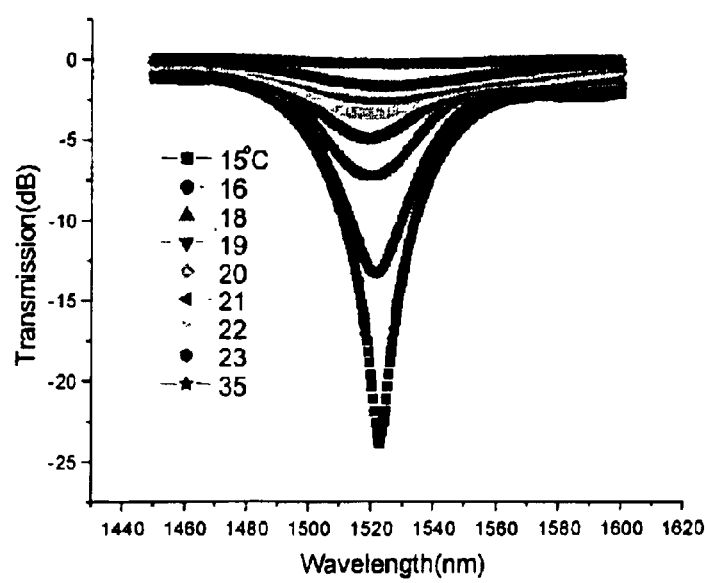
FIG. 2 shows the transmission of an adjustable fiber as a function of wavelength at different temperature for the coupling layer based on the design in FIGS. 1A and 1B where the coupling layer is formed of a thermal-optical material.

FIG. 2 shows the amplitude tuning of the fiber filter 100 by tuning a temperature of a thermal-optic coupling layer as the coupling layer 120. The temperature of the coupling layer 120 is adjusted to achieve different signal strengths in the guided light in the fiber 140. As shown by the curves, the center wavelength of the transmission band of the filter remains substantially unchanged when the coupling layer 120 is set at different temperatures. The peak transmission amplitude and the corresponding linewidth of the filter are changed with the temperature.

Notably, the above fiber filter 100 is sensitive to the wavelength of input light due to the coupling structure. The parameters of the device 100, including the waveguide thickness ($t_w$) and index ($n_w$) of the waveguide overlay 130, and the index ($n_s$) of the waveguide substrate 150, may be selected so that the device 100 is operable to evanescently couple optical energy out of the fiber 140 at a particular center wavelength with a certain spectral bandwidth. Different values of the device parameters may be used to generate different center wavelengths with different bandwidths. Hence, the device 100 in this regard is essentially a notch optical filter.

When the waveguide overly 130 is a multimode waveguide, different waveguide structures with different combinations of ($t_w$, $n_w$) may be used to support different modes with different center wavelengths for the filtering operations. With a proper combination of $t_w$ and $n_w$, for example, the center wavelength of the filter 100 may be fixed at a selected value. The peak transmission amplitude and the bandwidth of such a notch filter may be tuned by tuning the index $n_c$ of the coupling layer 120 as illustrated in an thermal-optic implementation shown in FIG. 2.

Figure 3B:
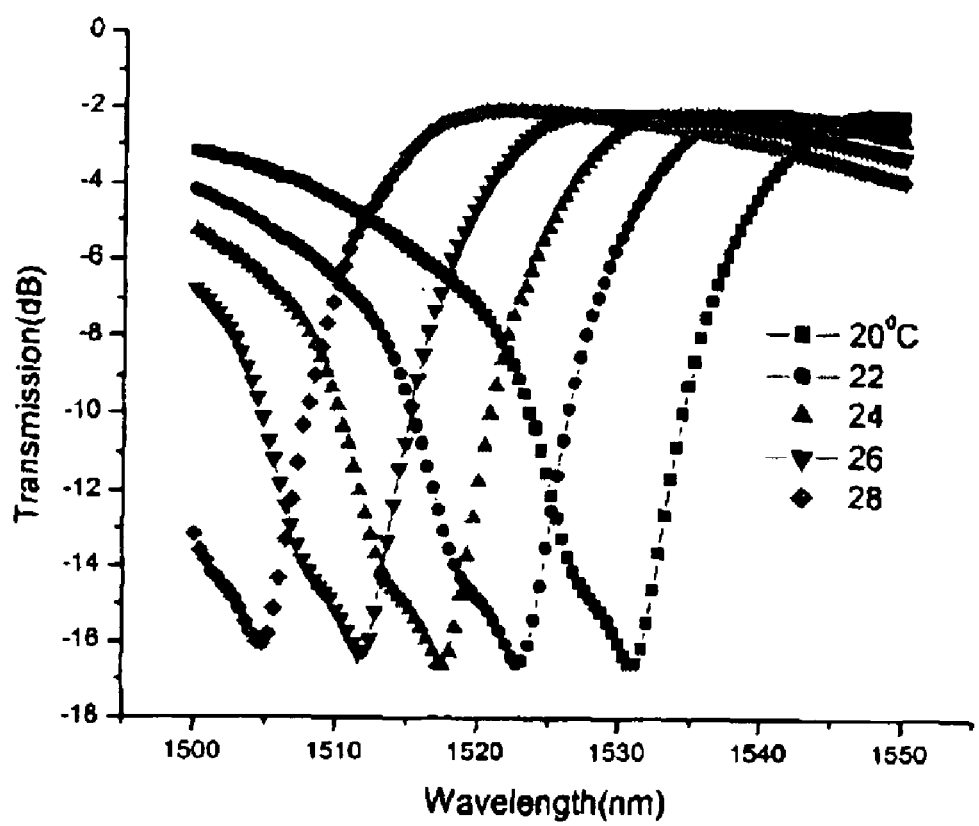
FIG. 3B shows the transmission of an adjustable filter as a function of wavelength at different temperature for the waveguide overlay based on the design in FIG. 3A where the waveguide overlay is formed of a thermal-optical material.

Alternative to adjusting the index of the coupling layer 120, the index of the waveguide overlay 130 may be made adjustable to tune the center wavelength of the transmission of the filter. FIG. 3A shows a fiber filter where the waveguide overlay 130 may be formed of an adjustable material whose index $n_w$ is tunable in response to a control signal or stimulus 312. A waveguide control unit 310 is used to generate and control the control signal 312. This control allows for controlling the center wavelength of the notch filter. FIG. 3B shows transmission spectra of the fiber filter in FIG. 3A for a fixed value of $n_c$ under different temperatures when the waveguide overlay 130 is formed of a thermal-optic material. The transmission profile of the filter in FIG. 3A is shifted with the change in the index $n_w$. The shape of the transmission profile, including the bandwidth, generally does not change significantly with the index $n_w$.

In yet another embodiment, both the waveguide overlay 130 and the coupling layer 120 may be adjustable and may be independently controlled, the attenuation or the signal coupling strength of such a tunable filter is adjusted by independently varying the index $n_c$ of coupling layer 120 and the center transmission wavelength is tuned by adjusting the index $n_w$ of the waveguide overlay 130. FIG. 4 shows this configuration where two separate control units 310 and 160 are shown to control the waveguide 130 and the coupling layer 120, respectively. Alternatively, the control units 310 and 160 may be combined into a single control unit.

Notably, a dynamic feedback control loop may be used to dynamically control the output spectrum of the filter by either controlling the coupling layer, the waveguide layer, or both. When two or more such filters are cascaded together, the adjustments on the transmission strength and the center wavelength may be used to set the cascaded filters at different settings to achieve a desired net output spectral profile for signal filtering, or gain flattening. In particular, the net output spectral profile may be dynamically adjustable in response to a change in the input spectral profile of an input optical signal to achieve a desired output spectral profile.

FIGS. 5A, 5B, 6A, and 6B show four examples of dynamically controlled fiber filters based on the above designs, where a fiber filter 510, 520, or 610 is dynamically controlled with a feedback loop. An optical coupling mechanism 520 is implemented in the fiber 140 to tap a portion of the filter output to an optical detector 530. The optical coupling mechanism 520 may be a fiber coupler or an optical beam splitter. In one implementation, the optical coupling mechanism 520 may be an optical fiber tap based on evanescent coupling where the fiber has an additional side surface formed at a location at one side of the fiber filters in the output path and the optical detector 530 is coupled to the additional side surface to receive a portion of the filtered output optical signal via evanescent coupling. The detector 530 converts the portion of the filtered optical output form the filter into a detector signal 532. In response to the detector signal 532, the feedback loop generates an error signal to indicate a difference between a desired spectral output and the actual spectral output and controls the coupling layer to reduce the difference.

Figure 5A:
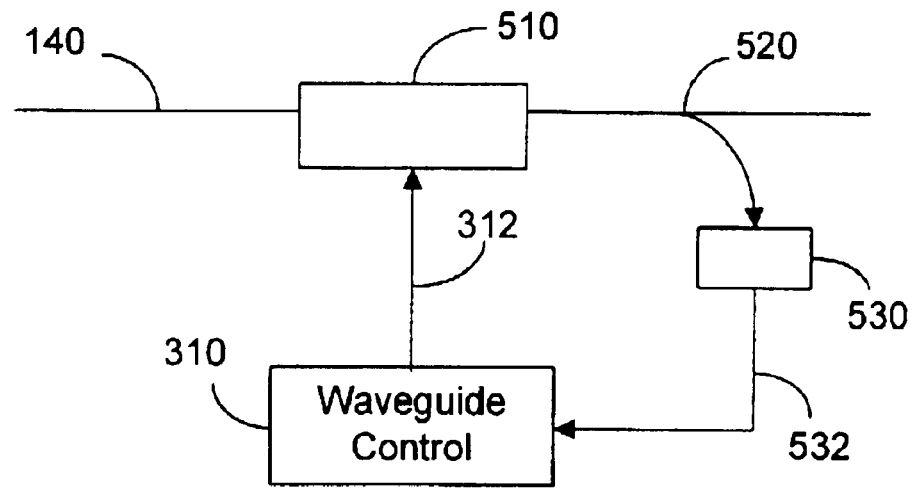
FIGS. 5A, 5B, 6A, and 6B show exemplary adjustable fiber filters with feedback control loops.
Figure 5B:
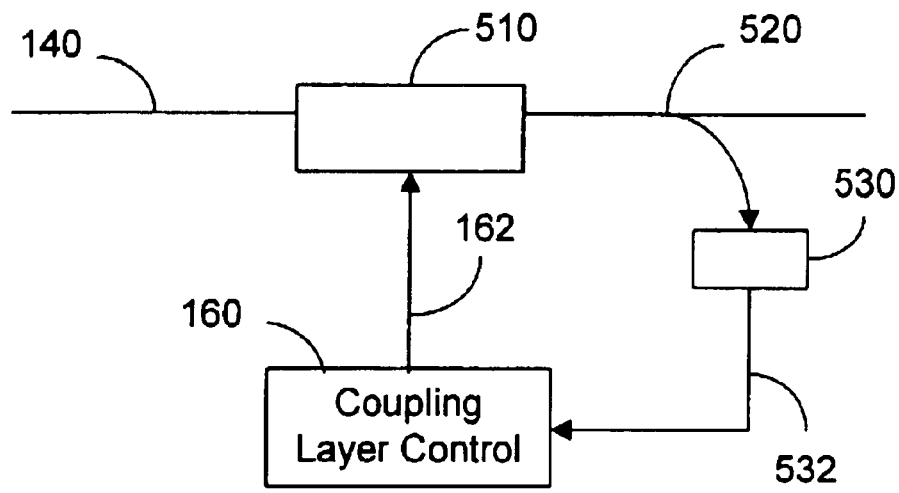
Figure 6A:
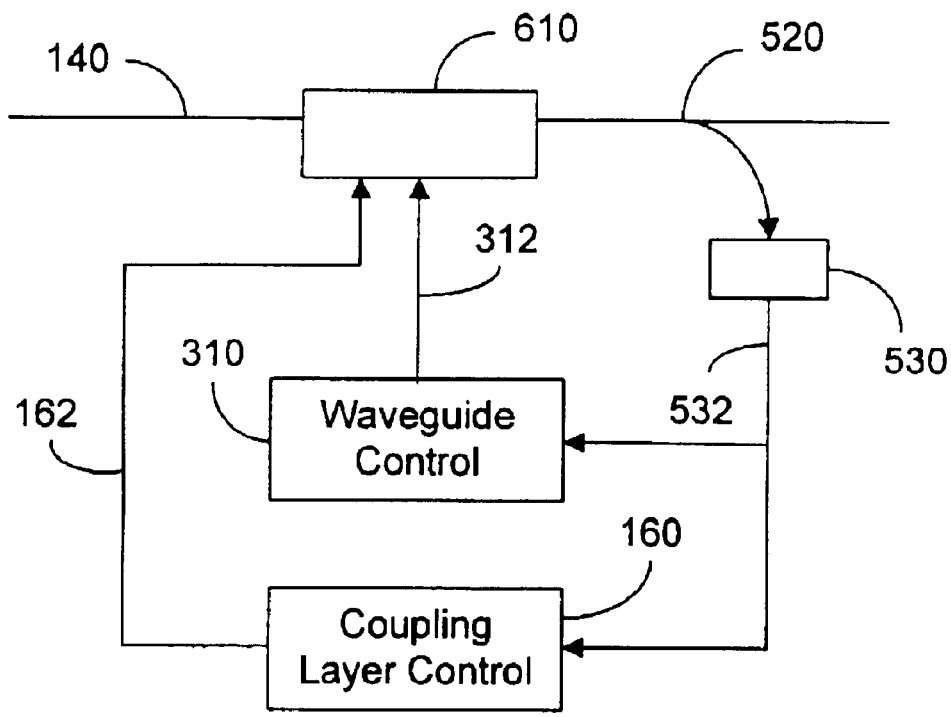
Figure 6B:
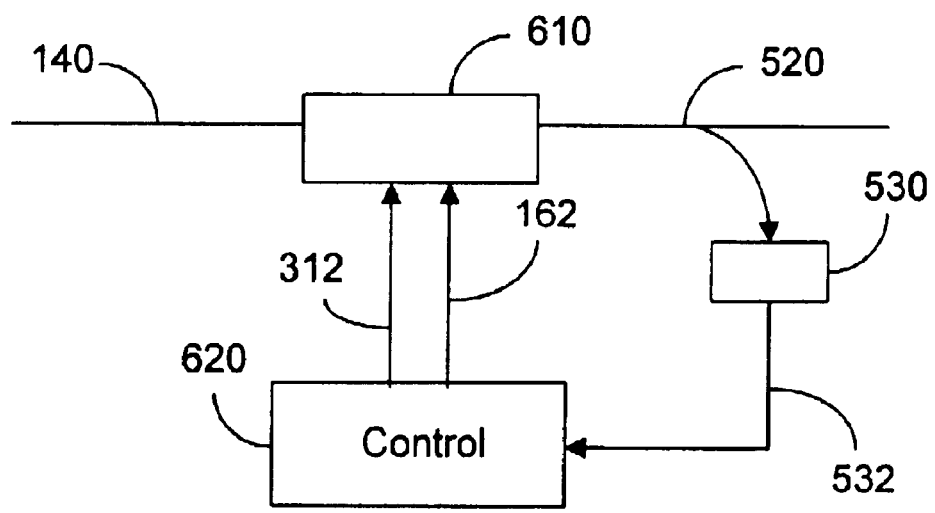

FIG. 5A shows the feedback control for controlling the waveguide overlay 130 to tune the center wavelength of the filter 510 based on the design in FIG. 3A. FIG. 5B shows the feedback control for controlling the coupling layer 120 to tune the amplitude of the peak transmission of the filter 520 based on the design in FIG. 1B. FIG. 6A shows the feedback control for controlling both the waveguide overlay 130 and the coupling layer 120 to tune the filter 610 based on the design in FIG. 4. FIG. 6B shows an alternative implementation where a single control 620 replaces two separate control units 160 and 310 in FIG. 6A.

Two or more such adjustable filters with different center notch wavelengths may be cascaded in an optical path to form an optical filter with a desired filtering spectrum. FIG.

Figure 7A:
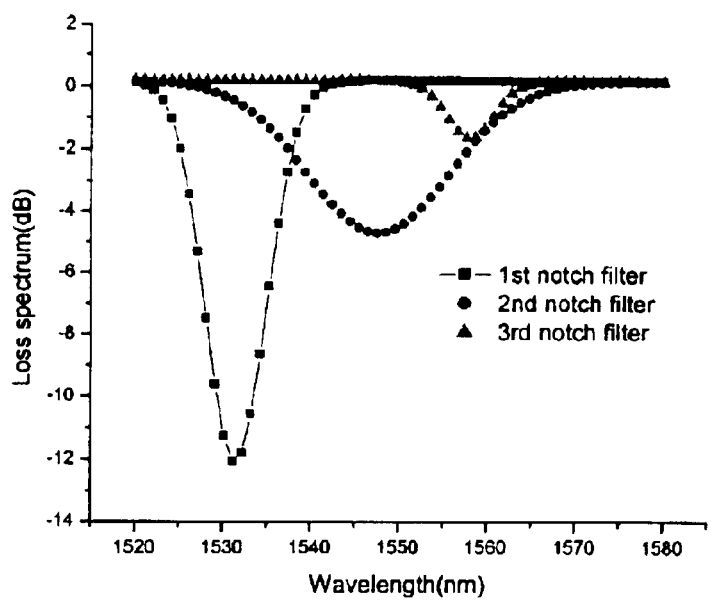
FIGS. 7A and 7B show effects of on the loss spectra by combining two or more filters in a cascaded configuration.
Figure 7B:
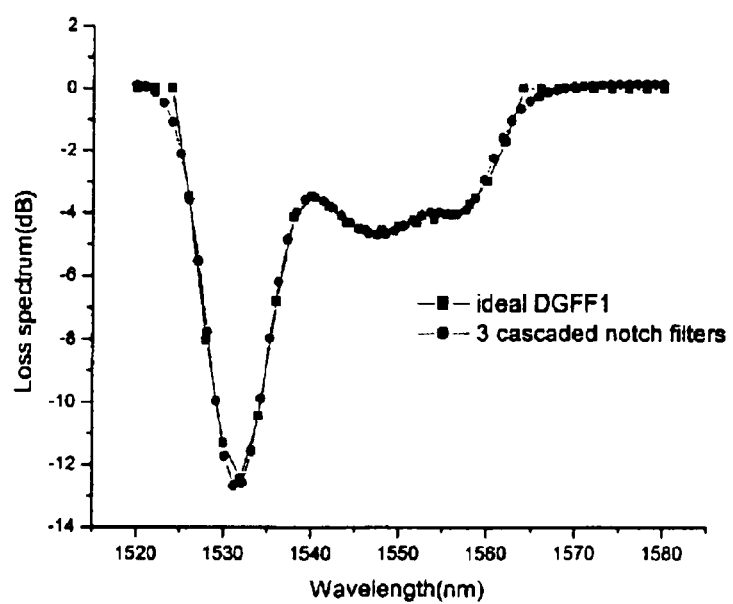

7A shows spectra of three different adjustable notch filters based on the design in FIG. 1A. FIG. 7B shows the net filtering spectrum of a filter that cascades the three filters. In general, any desired filtering spectrum may be achieved by properly selecting the spectra of individual filters.

Figure 7C:
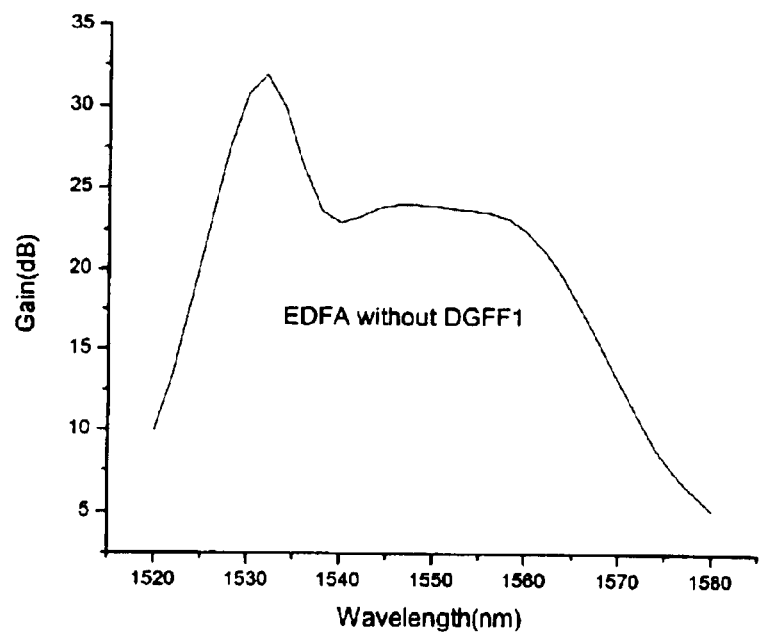
FIGS. 7C and 7D illustrate a use of multiple cascade filters to flatten a gain of an EDFA.
Figure 7D:
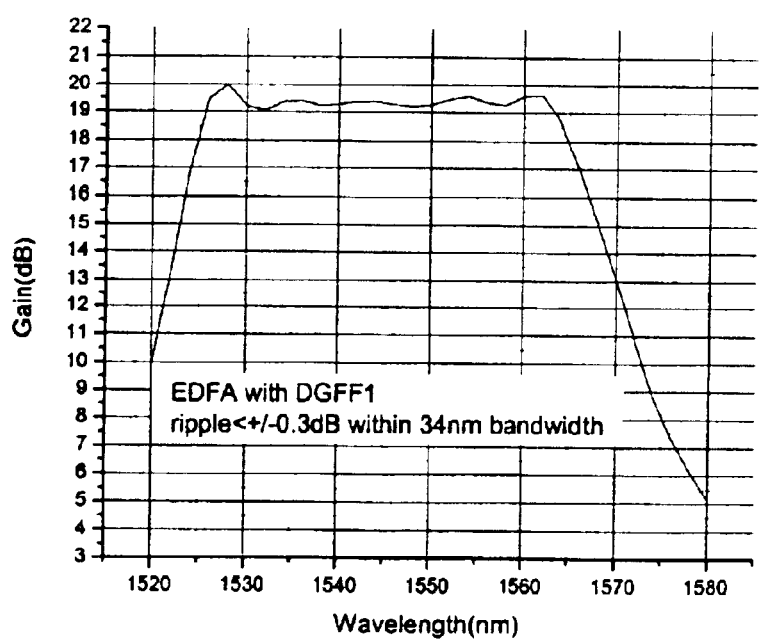

In one application, for example, the net filtering spectrum in FIG. 7B may be specifically designed to modify a gain spectrum of an optical amplifier such as an EDFA. FIG. 7C shows a gain profile of an exemplary EDFA. By using a filter with an output spectrum as shown in FIG. 7B, the optical gain of the assembly of the EDFA and the filter has a spectrum shown in FIG. 7D whose original gain spectrum is flattened by the filter over a 30 nm-wide spectral range. In order to improve the flatness of the EDFA, the number of the cascaded notch filters may be increased.

Figure 8:
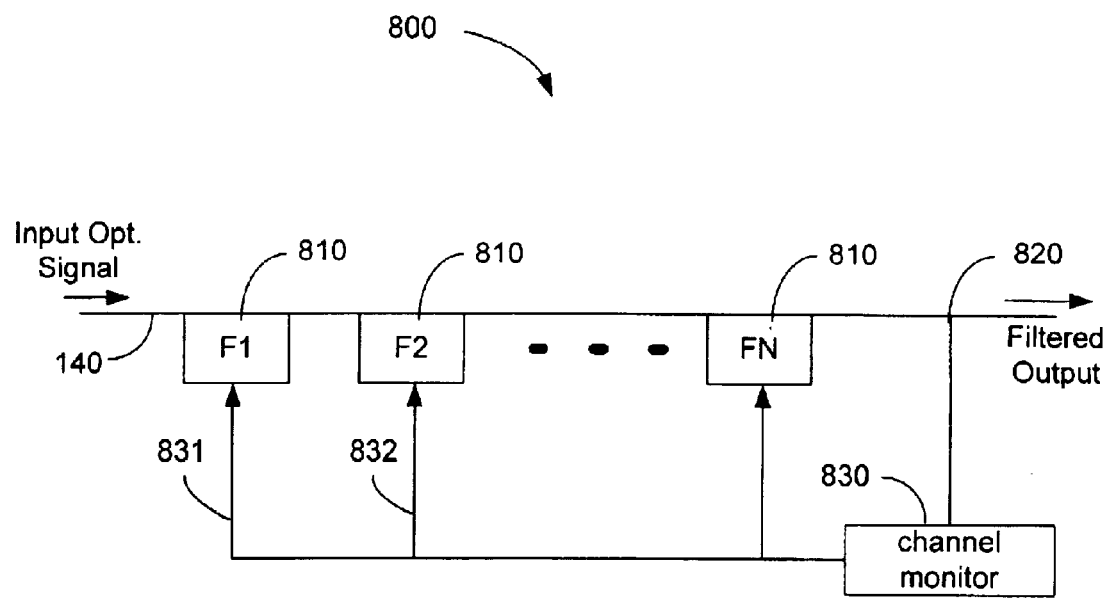
FIG. 8 illustrates a dynamically-adjustable fiber with multiple adjustable filters.

The cascaded filters may be used for dynamically flattening the spectral profile in the output of a fiber EDFA in applications where the spectral profile in the output may change over time. FIG. 8 shows an optical spectrum monitor device or spectrum detector 830 is used in a feedback loop for such dynamic control in a system 800 where multiple adjustable filters 810 are cascaded along a fiber line 140. An optical tap 820, such as a fiber coupler or other optical beam splitter, may be coupled at the output path of the cascaded filters 810 to split a fraction of the filtered signal to the monitor device 830. In one implementation, the optical tap 820 may be an optical fiber tap based on evanescent coupling where the fiber has an additional side surface formed at a location at one side of the fiber filters in the output path and the monitor device 830 is coupled to the additional side surface to directly receive a portion of the filtered output optical signal via evanescent coupling. The monitor device 830 measures the spectrum of the filtered signal and produces filter control signals 831, 832, etc. that are respectively directed to the different filters 810 to individually control the filters so that the filtered optical output has a desired spectral profile within a spectral range of interest, such as gain spectrum flattening as illustrated in FIGS. 7A–7D. In the beginning, all filters 810 may be set to default states to be transparent within band or at the outband, e.g., C or L band or both C and L bands. Within band, generic filters generate loss spectra like FIG. 7A to flatten gain spectrum. The outband filters (shifted to working band) can be used to fine tune the final gain spectrum. In an optically amplified wavelength division multiplexing networks, the gain spectrum of optical amplifiers may vary with different working conditions. This problem becomes more serious in long haul communication networks, where optical signals may propagate through a few tens optical amplifiers without electrical regeneration. On the other hand, the gain spectrum is also not static in dynamically reconfigured networks. Therefore, it may be desirable to use a dynamic adjustable gain spectral control device to solve this problem. The essential of the device is to build tunable notch filters to match the inverted gain spectrum of optical amplifier dynamically. The device in FIG. 8 provides one solution to this problem.

In some implementation, among the cascaded filters 810, some of the cascaded filters may be fixed filters and some may be adjustable filters as described above. A fixed filter may be implemented with the above filter structure without the controlling mechanism or in other suitable filter structures such as a fixed filter with a waveguide overlay 130 directly formed over the coupling surface 144 without the coupling layer 120. This combination of fixed filters and adjustable filters may be used to reduce the control complexity and device cost in comparison to a cascaded filter with all adjustable filters.

In the other applications, the above adjustable filters may be used to compensate for the dynamic gain tilt in dynamic amplified WDM network, where the amplifier gain spectra change with channel count, pump power and input power in a predicted manner. The transmission spectra of the filters may be designed to match the amplifier gain tilt over a wide dynamic range for such tilt compensation.

Fibers are only one implementation of waveguides. In the above designs, a fiber may be replaced by a planar waveguide formed on a substrate. Thus, the coupling layer 120 and the waveguide overlay 130 may be formed over the planar waveguide to form the filter similar to the filters shown in FIGS. 1B, 3A, and 4. Such waveguide-based filters may be dynamically controlled or cascaded with other waveguide-based filters or fiber-based filters as illustrated above.

Only a few embodiments are disclosed. However, various modifications and enhancements may be made without departing from the following claims.

What is claimed is:

1. A device, comprising:
   a waveguide to guide optical energy along an optic axis, said waveguide having a side surface positioned in an evanescent field of guided optical energy;
   a coupling layer formed over said side surface to have a refractive index that changes in response to a control signal to change a strength of optical evanescent coupling out of said side surface;
   a waveguide overlay formed above said coupling layer to support multiple waveguide modes and to receive optical energy from said coupling layer; and
   a controller to produce said control signal to said coupling layer,
wherein said waveguide overlay is formed of a material whose refractive index changes in response to a second control signal to adjust a wavelength of optical energy that can be evanescently coupled from said waveguide to said waveguide overlay through said coupling layer.

2. The device as in claim 1, wherein said waveguide is an optical fiber where said side surface is formed in fiber cladding of said optical fiber.

3. The device as in claim 1, wherein said waveguide is a planar waveguide.

4. The device as in claim 1, wherein said waveguide has a refractive index which changes with a waveguide control signal to further change an aspect of said optical evanescent coupling out of said side surface.

5. The device as in claim 1, wherein said coupling layer includes a thermal-optic material.

6. The device as in claim 1, wherein said coupling layer includes an electro-optic material.

7. The device as in claim 1, wherein said coupling layer includes a magnetic-optic material.

8. The device as in claim 1, wherein said coupling layer includes a radiation-sensitive material.

9. A device, comprising:
   a substrate having a groove;
      a fiber fixed in said groove of said substrate and having a portion of fiber cladding removed and polished to form a side surface in an evanescent field of guided optical energy in said fiber;
   a coupling layer formed over said side surface to have a refractive index that changes in response to a control signal to change a strength of optical evanescent coupling out of said side surface;
   a waveguide overlay formed above said coupling layer and to receive optical energy at a selected wavelength from said coupling layer;

an optical detector to receive a portion of an optical signal in said fiber that transmits through a section of said fiber with said side surface and operable to convert said portion into a detector signal;

a controller coupled to receive said detector signal and to produce said control signal in response to said detector signal; and a waveguide support substrate above said waveguide overlay, wherein said waveguide overlay is formed on said waveguide support substrate.

10. A device, comprising:

a substrate having a groove;

a fiber fixed in said groove of said substrate and having a portion of fiber cladding removed and polished to form a side surface in an evanescent field of guided optical energy in said fiber;

a coupling layer formed over said side surface to have a refractive index that changes in response to a control signal to change a strength of optical evanescent coupling out of said side surface;

a waveguide overlay formed above said coupling layer and to receive optical energy at a selected wavelength from said coupling layer;

an optical detector to receive a portion of an optical signal in said fiber that transmits through a section of said fiber with said side surface and operable to convert said portion into a detector signal; and a controller coupled to receive said detector signal and to produce said control signal in response to said detector signal, wherein said fiber has a second side surface formed at a location different said side section, and wherein said optical detector is coupled to said second side surface to receive said portion of said optical signal via evanescent coupling through said second side surface.

11. A device, comprising:

a fiber having a portion of fiber cladding removed and polished to form a side surface in an evanescent field of guided optical energy in said fiber at a plurality of different locations along said fiber;

a plurality of fiber filters respectively formed at said different locations in said fiber to respectively filter optical signals at different wavelengths in said fiber, each fiber filter including a coupling layer formed over said side surface to have a refractive index that changes in response to a control signal to change a strength of optical evanescent coupling at a corresponding wavelength, and a waveguide overlay formed above said coupling layer to receive optical energy at said corresponding wavelength from said coupling layer;

an optical detector to receive a portion of an optical signal in said fiber that transmits through said plurality of fiber filters and operable to convert said portion into a detector signal; and a controller coupled to receive said detector signal and to produce control signals respectively to said plurality of fiber filters in response to said detector signal.

12. The device as in claim 11, wherein said fiber has an additional side surface formed at a location at one side of said fiber filters, and wherein said optical detector is coupled to said additional side surface to receive said portion of said optical signal via evanescent coupling through said additional side surface.

13. The device as in claim 11, further comprising at least one fixed optical filter formed on said fiber at a location where a portion of fiber cladding is removed and polished to form a side surface in an evanescent field of guided optical energy in said fiber, and said fixed optical filter filters light guided in said fiber based on evanescent coupling through said side surface.

14. The device as in claim 11, wherein said waveguide overlay in each optical filter has a refractive index that changes in response to a waveguide control signal from said controller to change an aspect of optical evanescent coupling out of said side surface.

15. A method, comprising:

directing light into a fiber having a portion of fiber cladding removed and polished to form a side surface in an evanescent field of guided optical energy in said fiber, wherein a coupling layer is formed over said side surface to receive light from said fiber by evanescent coupling and a waveguide overlay is formed above said coupling layer to receive optical energy at a selected wavelength from said coupling layer; and controlling a refractive index of at least one of said coupling layer and said waveguide overlay to adjust the evanescent coupling from said fiber to said waveguide overlay in response to a control signal, wherein refractive indices of both said coupling layer and said waveguide overlay are adjusted.

16. The method as in claim 15, further comprising:

measuring a portion of light in said fiber that transmits through a section of said fiber with said side surface; and producing said control signal according to a property measured from said portion of light to adjust said refractive index to produce a desired property in said light after passing through said section with said side surface.

17. A method, comprising:

directing light into a fiber having a portion of fiber cladding received and polished to form a side surface in an evanescent field of guided optical energy in said fiber, wherein a coupling layer is formed over said side surface to receive light from said fiber by evanescent coupling and a waveguide overlay is formed above said coupling layer to receive optical energy at a selected wavelength from said coupling layer; and controlling a refractive index of at least one of said coupling layer and said waveguide overlay to adjust the evanescent coupling from said fiber to said waveguide overlay in response to a control signal, wherein a refractive index of said coupling layer is adjusted to change a strength of said evanescent coupling, and a refractive index of said waveguide overlay is adjusted to change a wavelength of light that is evanescently coupled.

18. The method as in claim 17, further comprising:

measuring a portion of light in said fiber that transmits through a section of said fiber with said side surface; and producing said control signal according to a property measured from said portion of light to adjust said refractive index to produce a desired property in said light after passing through said section with said side surface.

* * * * *